ANDRZEJ SMOLSKI
INVENTOR

BY
Irwin A. Lavine
ATTORNEY

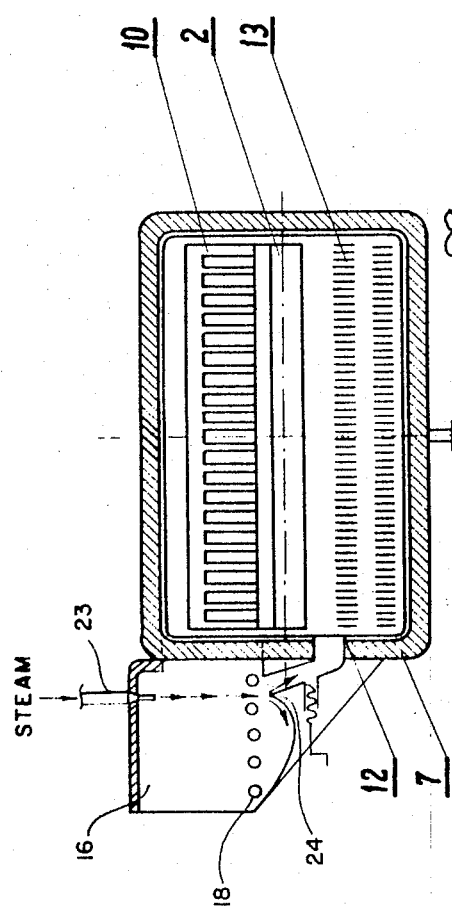
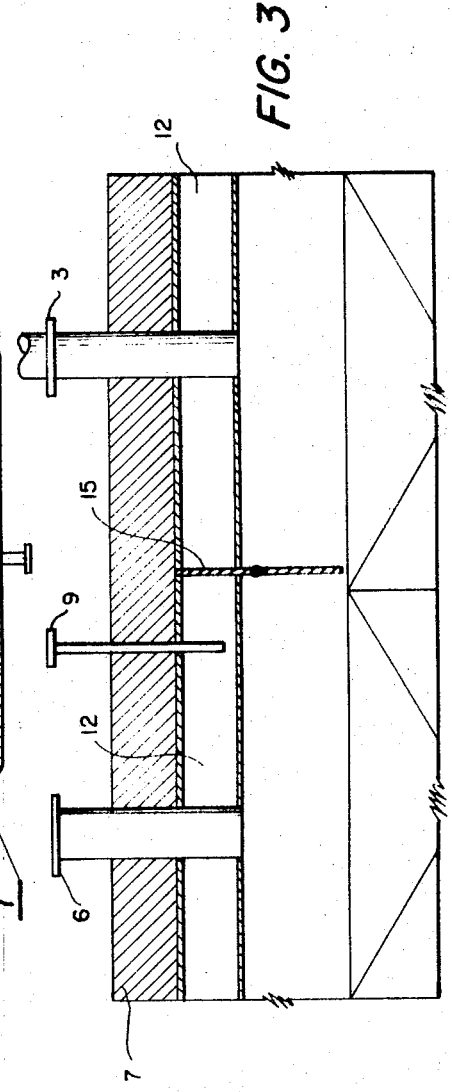

United States Patent Office 3,456,359
Patented July 22, 1969

3,456,359
TUNNEL DRIER FOR DRYING CERAMIC PRODUCTS
Andrzej Smolski, Mickiewicza 37m44, Warsaw, Poland
Continuation-in-part of application Ser. No. 527,121,
Feb. 14, 1966. This application Mar. 28, 1968, Ser.
No. 716,911
Int. Cl. F26b 21/10, 3/32, 15/12
U.S. Cl. 34—40                    9 Claims

ABSTRACT OF THE DISCLOSURE

A tunnel drier for drying ceramic products has a product inlet and an outlet substantially preventing the passage of gas to or from the drier, the drier having an interior, thermostatic-controlled heater and being divided into zones through which the products pass.

Cross-reference to related application

This application is a continuation-in-part of application Ser. No. 527,121, filed Feb. 14, 1966, now abandoned.

Background of the invention

The present invention is a drier for ceramic products, which in their wet or uncured state have a substantial moisture content.

Tunnel driers are known and commonly used for drying ceramic products. A certain amount of wet ceramic ware is introduced into the tunnel drier and at the same time a load of dried products is withdrawn from the drier. A hot drying medium is introduced at one end into the tunnel from a central ducting system situated above and below the said tunnel. The drying medium, passing through the tunnel, gradually cools and acquires moisture from the products. The drying medium, saturated with moisture, is drawn away by an exhaust ducting system; some of the drying medium, after-reheating, is partially ready for re-circulation and is re-admitted after re-mixing with fresh air. The drying medium of the drier is hot air or gases of combustion. These gases are produced in a heater, heating stoves or other industrial kilns.

Such tunnel driers as described above may be either continuous or batch driers. They are expensive to build, and add significantly to the cost of the ceramic products, due at least in part to the length of time the ceramic products must remain in the drier. Driers have heretofore been spaced from the means, such as an extruder or other molding devices, for producing the ceramic products, thereby permitting the product to cool before being introduced into the drier.

Summary of the invention

The present invention provides a closed tunnel drier having an inlet and an outlet for ceramic products which substantially prevent gas, air or steam from passing to or from the tunnel. The tunnel has heating means inside it, but has no external moisture supply, moisture for steam being derived from the ceramic products. The tunnel has interior heaters, gas circulators, and curtains for dividing the tunnel into zones through which the ceramic products serially pass on a suitable conveyor. Thermostatic controls sense the temperatures in the zones and control the heaters. In addition, the inlet of the tunnel drier of the present invention is situated directly adjacent the means for producing the ceramic products, so as to directly receive them from the producer device.

The present invention tunnel drier achieves the objects of low initial cost, drastically reduced in-drier time for the ceramic products, lower cost of ceramic products, and superior control of the atmosphere within the tunnel and therefor of the drying of the ceramic products.

Brief description of the drawing

FIG. 2 is a cross sectional view taken on the line 2—2 of FIG. 1.
FIG. 3 is a detail view.

Description of the preferred embodiment

Figure 1:
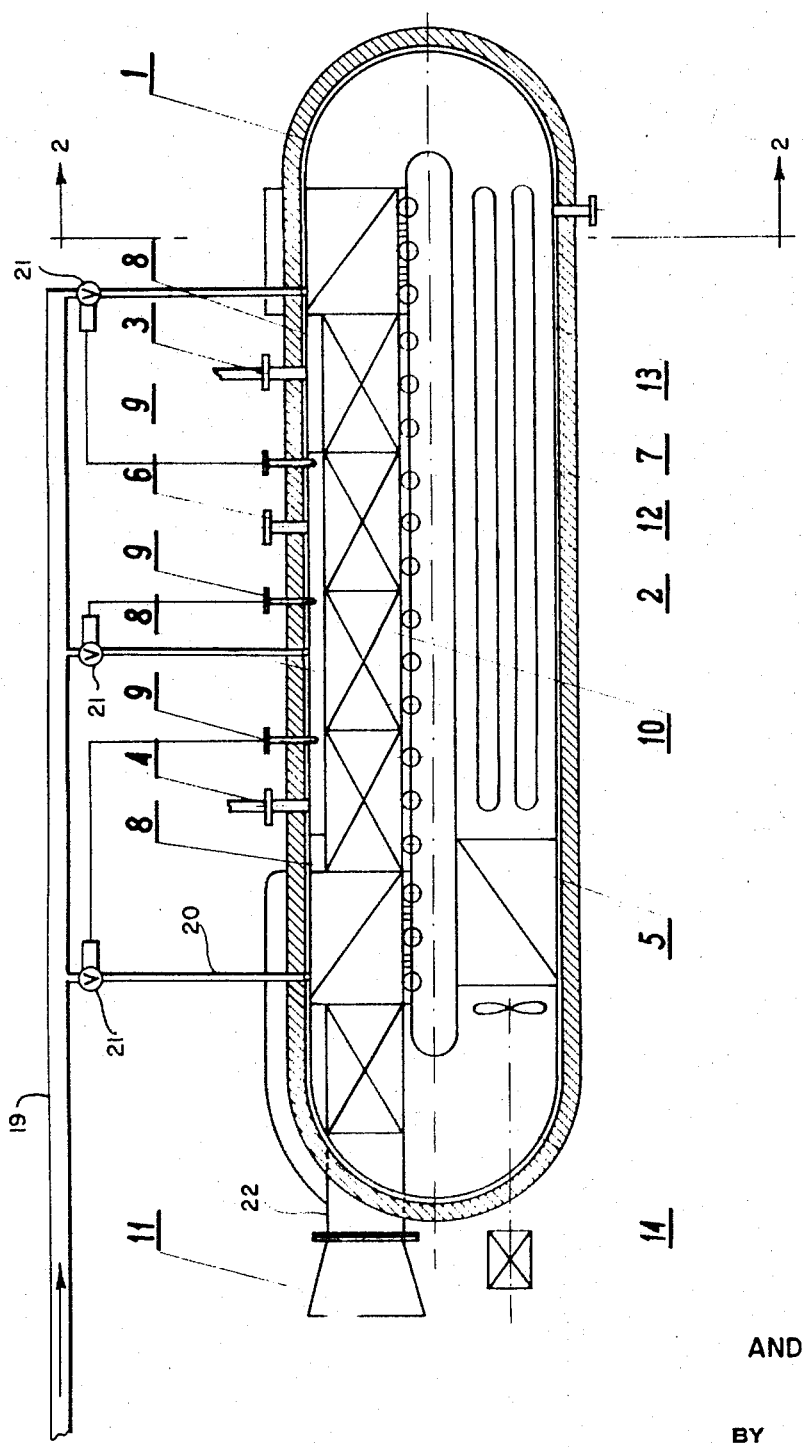
FIG. 1 is a longitudinal section view of the dryer with parts shown schematically.

Referring now to the drawing, there is shown in FIG. 1 a longitudinal section of a tunnel dryer 1 in accordance with the present invention, together with the heating and control system therefor. Within the dryer 1 there is provided a conveyor or transporter 2 for moving articles to be dried through the dryer. The tunnel dryer 1 may be encased within an insulating layer 7 within which is a heated jacket 12. Jacket 12 may comprise, for example, conduits or passages for a hot fluid, such as water or steam. The hot fluid is supplied from a supply conduit 19, through individual branch conduits 20 which enter the jacket 12 at several spaced inlets 17.

In the lower part of the tunnel dryer 1 there is provided an air heater 5 and an additional heater 13. Circulation within the tunnel dryer 1 is provided by a motor-driven fan 14.

In order to provide for effective control of the atmosphere within tunnel dryer 1, curtains 15, shown in FIGS. 1 and 3, are provided, the curtains 15 being made of suitable heat and moisture resistant material, such as steel, and serving to divide the dryer 1, or that portion of it within which the products are positioned, into separate zones 8, there being three such zones in the embodiment shown in FIG. 1.

The tunnel dryer 1 is provided with a steam outlet 3 to permit the removal from within it of excess steam. A pressure control valve 4 is provided to insure against excessive pressure within the tunnel dryer 1, and an air intake valve 6 is provided in order to permit the introduction of additional air as required to maintain a satisfactory atmosphere within tunnel dryer 1.

In addition, a number of temperature control devices 9 are provided and each is connected with a control valve 21, each of which is positioned in one of the branch conduits 20. By this latter construction, more or less heating fluid is supplied through the branch conduits 20 to the different regions of the dryer 1 by being supplied to different portions of the jacket 12.

The tunnel dryer 1 is positioned so as to directly receive ceramic products, generally designated 10, from a machine which has formed such products, the terminal portion of which is designated 11. The machine may be either an extruder or a molding machine, or any other known machine for manufacturing ceramic products. The products 10 enter the dryer 1 through a passage 22 directly connected with the machine, thereby preventing the entry of any significant amount of air into the dryer 1 with the introduction of the products 10. The products 10 pass through the several zones 8 of the tunnel dryer 1, from left to right as shown in FIG. 1, and are then moved laterally through the side of tunnel dyer 1 on a suitable conveyor 18. As shown in FIG. 2, an outlet chamber 16 is provided, having therein suitable nozzles 23 which are supplied with steam and which are directed downwardly, impinging upon a divider element 24, a part of the steam thereby being caused to flow inwardly into the tunnel dryer 1, and a part of the steam flowing outwardly, as indicated by the arrows in FIG. 2. The nozzles 23 serve to provide a steam curtain which, together with the outlet chamber 16, permits products 10 to move laterally outwardly on the conveyor 18 from an end zone of the tunnel dryer 1, while substantially preventing the passage of atmospheric air into the tunnel dryer 1. This noted construction also prevents the passage of the gas and moisture within the tunnel dryer outwardly through the outlet 16, to any significant extent. The steam for nozzles 23 is preferably drawn from dryer 1.

The tunnel dryer of the present invention is comparatively inexpensive to build, and permits the passage of ceramic products therethrough, with their appropriate drying, in a greatly reduced amount of time. The present invention tunnel dryer achieves the drying of the ceramic product by superheated steam, the moisture of which is derived from the ceramic products being dried. Adequate provision is made for the initial introduction of air, or the introduction of air into the tunnel dryer, which is substantially closed, as may be required. In addition, the present invention tunnel dryer has internal heaters, with circulating means, and control of the temperature within the tunnel dryer by suitable temperature sensing and heat supply means.

While in the above discussion of the present invention the heat has been from a heated fluid such as hot water or steam, it will be understood that electric heaters could be used, with regulation of current supply for the temperature sensing devices.

It will be obvious to those skilled in the art that various changes may be made without departing from the spirit of the invention and therefore the invention is not limited to what is shown in the drawings and described in the specification but only as indicated in the appended claims.

I claim:
1. Apparatus for drying products comprising:
   (a) means for defining a closed chamber;
   (b) heating means within said chamber;
   (c) inlet passage means closed to the atmosphere adapted to directly connect said closed chamber with the terminal portion of means for producing ceramic products for introducing products into said chamber thereby substantially preventing the introduction of air into said chamber with said products;
   (d) means for moving articles into and through said chamber;
   (e) outlet means for permitting articles to pass from said chamber and including means for substantially preventing the passage of atmospheric air into said chamber and the passage of gas from said chamber;
   (f) means for circulating gas within and through said chamber;
   (g) and means for maintaining said chamber at a preselected temperature.

2. The apparatus of claim 1, and means for dividing said chamber into a series of zones, said temperature maintaining means comprising means for maintaining said zones at preselected temperatures.

3. The apparatus of claim 2, said means defining said closed chamber comprising a heating jacket, and said means for maintaining said zones at a preselected temperature including means for controlling the supply of heat energy to said heating jacket.

4. The apparatus of claim 3, said heating jacket having plural heat energy supply inlets thereto, and said control means comprising means for individually controlling the supply of heat through said supply inlets.

5. The apparatus of claim 4, said control means further comprising spaced temperature sensing means in said closed chamber each of which is operatively connected with a supply inlet control means.

6. The apparatus of claim 1, said means defining said closed chamber further comprising a heating jacket having fluid conduit means therein for receiving a heating fluid.

7. The apparatus of claim 1, and a steam outlet from said closed chamber.

8. The apparatus of claim 1, and air inlet valve means for said chamber.

9. The apparatus of claim 1, said outlet means comprising a passage from said closed chamber, and means for directing a current of steam across said outlet.

References Cited
UNITED STATES PATENTS

| | | | |
|---|---|---|---|
| 1,084,803 | 1/1914 | Jungels | 34—37 |
| 2,575,462 | 11/1951 | Nugey | 25—142 |
| 1,828,669 | 10/1931 | Kalzinski | 25—142 |
| 3,255,866 | 1/1966 | Gulde et al. | 25—142 |

KENNETH W. SPRAGUE, Primary Examiner

U.S. Cl. X.R.

34—105, 212, 219